May 6, 1952     E. L. MORRIS     2,595,806
ROPE FITTING
Filed April 6, 1949     2 SHEETS—SHEET 1
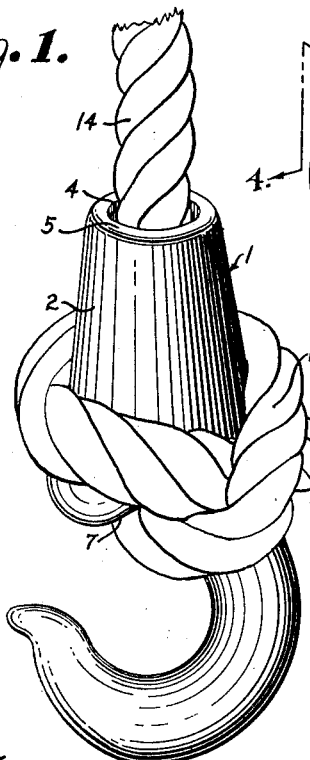
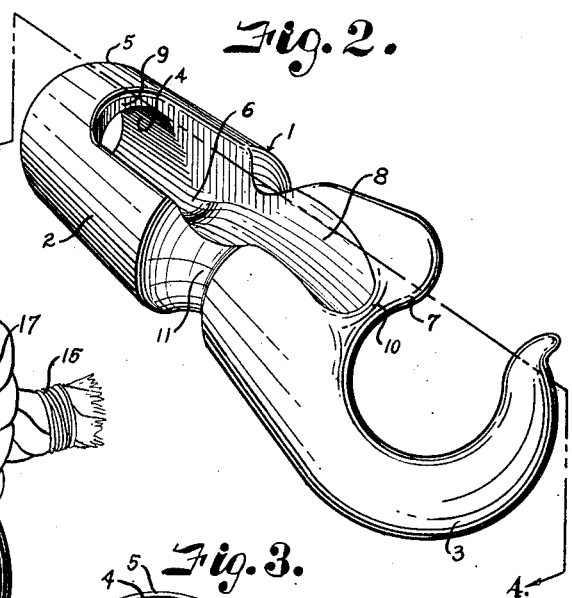
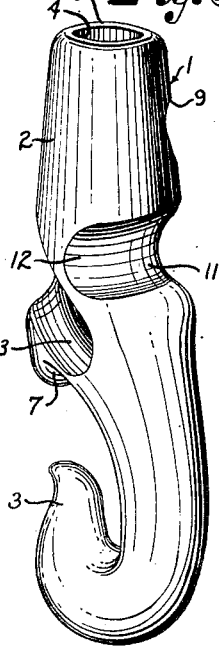
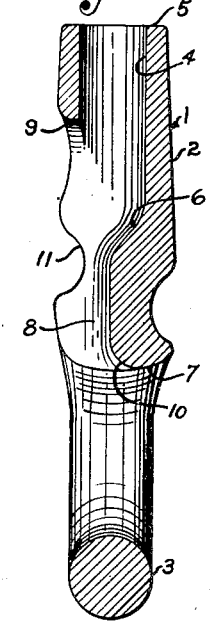
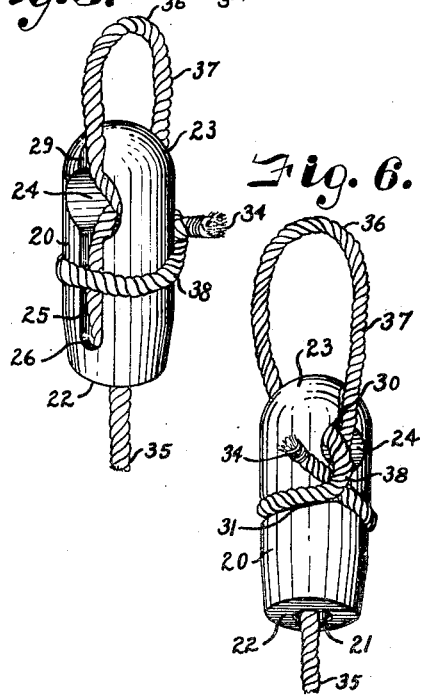
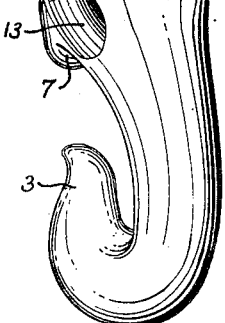
Inventor
EDWARD L. MORRIS
By Fishburn + Mullendore
Attorneys

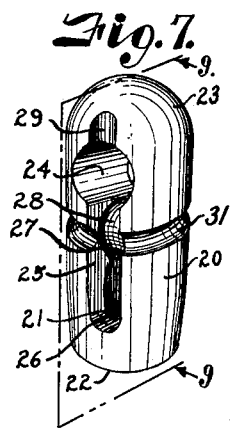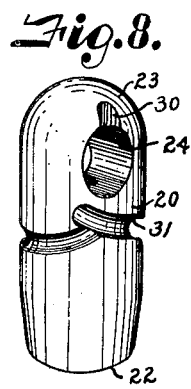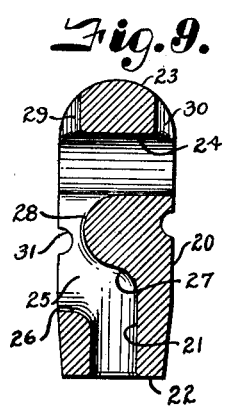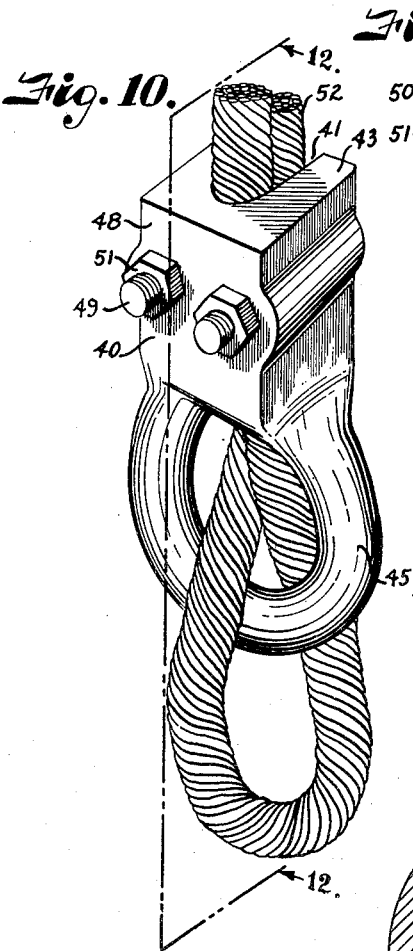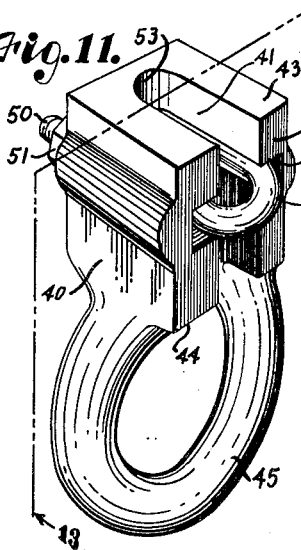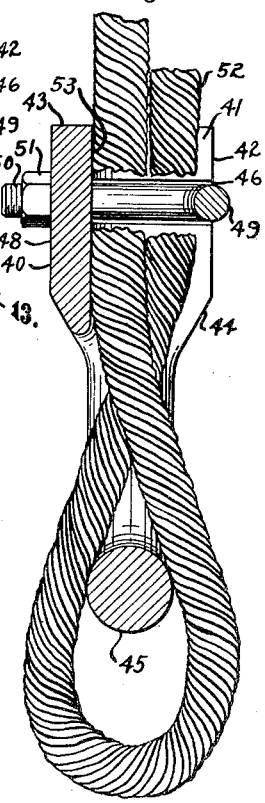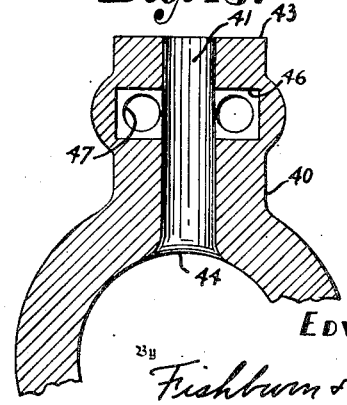
Inventor
EDWARD L. MORRIS

Patented May 6, 1952

2,595,806

UNITED STATES PATENT OFFICE 2,595,806

ROPE FITTING

Edward L. Morris, Lees Summit, Mo., assignor to Edith Morris, Lees Summit, Mo.

Application April 6, 1949, Serial No. 85,871

1 Claim. (Cl. 24—129)

This invention relates to a rope fitting and more particularly to a fitting which may be secured to the end of a flexible rope or strand and is adapted for attachment to other devices, said strand having loops related to portions which snub the free end of the rope whereby said loop portions becomes tighter the stronger the pull on said rope.

The objects of the present invention are to provide a rope fitting having a central bore and related grooves for receiving loops of a flexible rope for securing the body on the end of said rope, all portions of said rope subjected to tension being gradually curved or straight so substantially the full breaking strength of the rope can be utilized; to provide a rope fitting in which the free end of the rope is secured and the intermediate portion forms a loop or noose; to provide a fitting for attachment to the end of a flexible rope with a loop of said rope for attaching to other devices, said loop being freely variable in size when substantially no tension is applied thereto but which is clamped in selected position when tension is applied to the rope; to provide a fitting having a substantially axial passage for the rope secured thereto, the extreme end of the rope extending from the passage and forming a snubbing loop in grooves about the fitting, said loop overlying the portion in the passage tending to bind same against creeping; to provide a rope fitting to which a rope may be manually applied and tension on said rope pulls the end into a snubbing loop binding the fitting to the rope; to provide a rope fitting which will not bend the rope at such a sharp angle as to cause it to rapidly wear out, and which will be devoid of sharp edges and which is adaptable to be cast to thus reduce the cost of labor of manufacture; and to provide a rope fitting structure that is strong, durable and efficient in operation, easy and economical to manufacture, and to which a rope may be easily and manually applied.

In accomplishing these and other objects of the present invention, I have provided improved details of structure, the preferred forms of which are illustrated in the accompanying drawings, wherein:

Fig. 1 is a perspective view of a rope fitting embodying the features of the present invention with a rope received thereon, said fitting being shown as terminating in a hook portion.

Fig. 2 is a perspective view of the rope fitting with the rope removed therefrom, particularly illustrating the axial passage in the fitting.

Fig. 3 is a perspective view of the rope fitting particularly illustrating the grooves around said fitting.

Fig. 4 is a longitudinal sectional view through the fitting on the line 4—4, Fig. 2.

Fig. 5 is a perspective view of a modified form of a rope fitting with a rope applied thereto whereby the intermediate portions of said rope form a loop or noose.

Fig. 6 is a perspective view of the fitting shown in Fig. 5 particularly illustrating the position of the end of the rope and related snubbing loop.

Fig. 7 is a perspective view of the modified form of fitting similar to Fig. 5 with the rope removed therefrom.

Fig. 8 is a perspective view similar to Fig. 6 with the rope removed therefrom.

Fig. 9 is a longitudinal sectional view through the rope fitting on the line 9—9, Fig. 7.

Fig. 10 is a perspective view of a further modified form of rope fitting, the intermediate portion of the rope forming a noose.

Fig. 11 is a perspective view of the modified form of rope fitting shown in Fig. 10, taken from the opposite side thereof.

Fig. 12 is a longitudinal sectional view through the rope fitting on the line 12—12, Fig. 10.

Fig. 13 is a longitudinal sectional view through the fitting taken on the line 13—13, Fig. 11.

Referring more in detail to the drawings:

1 designates a rope fitting preferably of metal and adapted to be cast, said fitting comprising an elongated body member 2 terminating at one end in a hook or other conventional shaped member for securing the fitting to some other object. The body member has an axial bore 4 opening to the end 5 opposite to the hook 3 and extending toward said hook end. The bore 4 terminates as at 6 in spaced relation to the end 7 of the body member adjacent the hook and communicates with a groove 8 in the side of the body member. The groove 8 preferably extends from the end 7 and terminates as at 9 in spaced relation to the end 5, and is the same width as the diameter of the bore 4. The base of the groove 8 is preferably substantially in line with the axis of the bore 4 with the connecting portions of the groove and bore sloping and rounded at 6 to reduce the bending of the rope and eliminate all portions tending to wear or cut the same. The end 7 of the body member is provided with a radius 10 intersecting the groove 8. The body member 2 is provided with a peripheral groove 11 which starts as at 12 on one side of the groove 8 and extends substantially one-half way around the body member intersecting the groove 8 adjacent the end 6 of the bore 4 said groove 12 terminating in a downwardly inclined portion 13 extending between the end 7 of the body member and the end 12 of the groove 11, as illustrated in Fig. 3.

In using the rope fitting, a rope 14 is secured to the fitting by passing the end of the rope through the bore 4, groove 8 and turning the end of said rope reversely around the end 7 of the body member and upwardly whereby the rope lies in the groove 11, the end extending in the portion 13 and under the loop portion 17 between the radius 10 and the end 12 of the groove 11. With this arrangement the end 15 is under a loop in the rope whereby tension applied to the rope 14 pulls the loop portion of the rope into place and into engagement with the end 15 of said rope.

The more tension applied to the rope 14, the tighter the snubbing action on the end of the rope. This tension also applies pressure on the portion of the rope in the groove 8 which is under the rope in the groove 11 to prevent creeping of the rope in the fitting.

In the form of the invention illustrated in Figs. 5 to 9 inclusive, the body member 20 is provided with an axial bore 21 opening from the end 22 and extending into said body member toward the opposite end 23 thereof, said end preferably being rounded to eliminate edges thereon. A bore 24 extends transversely of the body member adjacent the end 23 and perpendicular to the axis of the bore 21. Arranged on one side of the body member is a slot 25 registering with one end of the bore 24 and extending into the body member to intersect the bore 21 and the bore 24, said slot 25 extending from the bore 24 toward the end 22 and terminating as at 26 to provide sufficient metal around the bore 21 for adequate strength in the fitting. The bore 21 terminates as at 27 in spaced relation to the bore 24, the portions between said bores and defined by the groove 25 being provided with a rounded surface 28. The body member is provided with a groove 29 in the end 23 in alignment with the groove 25, also with a corresponding groove 30 on the diametrically opposite side of said body member, the grooves 29 and 30 intersecting the bore 24. A peripheral groove 31 is provided in the body in alignment with the rounded portion 28, the ends of said groove being inclined toward the end 23 of the body member adjacent the bore 24 on the opposite side to the slot 25.

In applying a rope to the rope fitting shown in Figs. 5 to 9 inclusive, the end 34 of a rope 35 is threaded through the bore 21, through the slot 25 over the rounded surface 28, through the bore 24, groove 30, and turned backwardly as at 36 leaving a loop 37 at the end of the body member, the extreme end being fitted to the groove 29, bore 24 and arranged in the groove 31 to form a loop 38 extending from the bore 24 through the grooves whereby the end 34 is under the loop 38. When the rope is pulled, and the loop 37 secured to another object, the tension of the rope 35 tightens the loop 38 snubbing the end 34, and also provides some snubbing action on the rope 35 between the loop in the groove 31 and the surface 28. With this arrangement, loosening the pull on the rope 35 will permit said rope to slip in the slot 25 whereby the loop 37 may be adjusted as to size. When pull is again applied to the rope 35, the end is snubbed in place to secure the fitting on the rope and to provide substantially the full breaking strength of the rope for pulling action. The adjustability of the loop 37 permits the rope to be secured to substantially any other object as well as various other means for securing said rope and fitting to objects to which pulling force is to be applied.

In the forms of the invention illustrated in Figs. 10 to 13 inclusive, a body member 40 is provided with a slot 41 opening from one side as at 42 and extending from the end 43 to an end 44 where the body member terminates in a ring 45. Extending into the body member from the side 42 and arranged on each side of the slot 41 are grooves 46, said grooves aligning with apertures 47 extending through the side 48. A U-bolt 49 having legs 50 is arranged in the grooves 46 whereby said legs extend through the apertures 47, the ends of said legs being threaded to receive nuts 51.

In applying a rope to the fitting shown in Figs. 10 to 13 inclusive the end 52 of the rope is arranged in the slot 41 in contact with the bottom 53 thereof, said end extending beyond the ring 45 and forming a reverse loop whereby the end 52 extends on the reverse side of the ring adjacent the wall portion 48 and the back into the slot 41 and through the U-bolt 49. The nuts 51 are then tightened to draw the U-bolt into engagement with the rope, clamping said portions of the rope together. With this arrangement the loop may be connected to other objects and may be provided with a thimble if desired, the ring separating the portions of the rope adjacent the loop to prevent too small a bend in said loop.

It is believed obvious that I have provided a rope fitting which may be quickly applied to a rope and easily connected to other objects as desired, the actual application of the rope to the fitting being manual, and the pulling end of the rope snubbing the ends thereof to securely hold the fitting on said rope.

What I claim and desire to secure by Letters Patent is:

A rope fitting adapted to be secured on a flexible rope comprising, an elongated body member having a transverse aperture therethrough adjacent one end, said body member having an axial aperture extending therein and opening from the other end of the body member, a longitudinal groove opening from the side of the body and communicating with the axial aperture in spaced relation to said other end, said groove being in alignment with the transverse aperture and extending thereacross to said one end, diametrically opposed grooves in the body member intersecting said transverse aperture and extending to the adjacent end of the body member, an encircling groove of lesser depth than the longitudinal groove and intersecting said longitudinal groove between the transverse aperture and adjacent end of the axial aperture, said encircling groove intersecting the longitudinal groove substantially at right angles and terminating in an inclined portion sloping toward the transverse aperture, terminals of the encircling groove being on the opposite side of the body member to the longitudinal groove, whereby the end of the rope can be passed through the axial aperture arranged in the longitudinal groove, passed through the transverse groove, around the end of the body adjacent the transverse aperture and back through the transverse aperture, looped about the body in the encircling groove with the end of the rope passed under the intermediate portion of said rope at the terminus of the encircling groove, said portion of the rope looped about the body being engaged with and overlying the portion in the longitudinal groove for snubbing the rope in said longitudinal groove.

EDWARD L. MORRIS.

REFERENCES CITED

The following references are of record in the file of this patent:

UNITED STATES PATENTS

| Number | Name | Date |
| --- | --- | --- |
| 668,828 | Bell | Feb. 26, 1901 |
| 849,983 | Denlea | Apr. 9, 1907 |
| 1,268,995 | Parmeter | June 11, 1918 |
| 2,174,192 | Meighan | Sept. 26, 1939 |
| 2,240,510 | Meighan | May 6, 1941 |